(12) United States Patent
Radatti et al.

(10) Patent No.: US 8,171,549 B2
(45) Date of Patent: ***May 1, 2012

(54) APPARATUS, METHODS AND ARTICLES OF MANUFACTURE FOR INTERCEPTING, EXAMINING AND CONTROLLING CODE, DATA, FILES AND THEIR TRANSFER

(75) Inventors: Peter V. Radatti, Conshohocken, PA (US); Richard J. Perry, Drexel Hill, PA (US)

(73) Assignee: Cybersoft, Inc., Conshohocken, PA (US)

( * ) Notice: Subject to any disclaimer, the term of this patent is extended or adjusted under 35 U.S.C. 154(b) by 859 days.

This patent is subject to a terminal disclaimer.

(21) Appl. No.: 10/832,138

(22) Filed: Apr. 26, 2004

(65) Prior Publication Data

US 2005/0240910 A1 Oct. 27, 2005

(51) Int. Cl.
*H04L 29/06* (2006.01)
*H04L 9/32* (2006.01)
*G06F 11/14* (2006.01)

(52) U.S. Cl. .......... 726/23; 713/153; 713/165; 713/168; 726/25

(58) Field of Classification Search .............. 726/22–25; 713/187, 188
See application file for complete search history.

(56) References Cited

U.S. PATENT DOCUMENTS

| | | | | |
|---|---|---|---|---|
| 6,161,130 | A * | 12/2000 | Horvitz et al. | 709/206 |
| 7,290,282 | B1 * | 10/2007 | Renert et al. | 726/24 |
| 7,434,260 | B2 * | 10/2008 | Hong et al. | 726/22 |
| 7,636,945 | B2 * | 12/2009 | Chandnani et al. | 726/24 |
| 2002/0073330 | A1 * | 6/2002 | Chandnani et al. | 713/200 |
| 2004/0073617 | A1 * | 4/2004 | Milliken et al. | 709/206 |
| 2004/0181684 | A1 * | 9/2004 | Hong et al. | 713/200 |
| 2005/0108339 | A1 * | 5/2005 | Gleeson et al. | 709/206 |

* cited by examiner

*Primary Examiner* — Nasser Goodarzi
*Assistant Examiner* — Fatoumata Traore
(74) *Attorney, Agent, or Firm* — John F. A. Earley, III; Frank J. Bonini, Jr.; Harding, Earley, Follmer & Frailey, P.C.

(57) ABSTRACT

Apparatus, methods and articles of manufacture are disclosed for analyzing code. A valuation component, which provides a value for analyzed code is comprised of a tokenization component, hashing component and numerical valuation component. As code is transferred through the components, a numerical value for the code is generated. The valuation may occur through hashing, probability analysis and comparison against a proscribed code indicator.

27 Claims, 1 Drawing Sheet

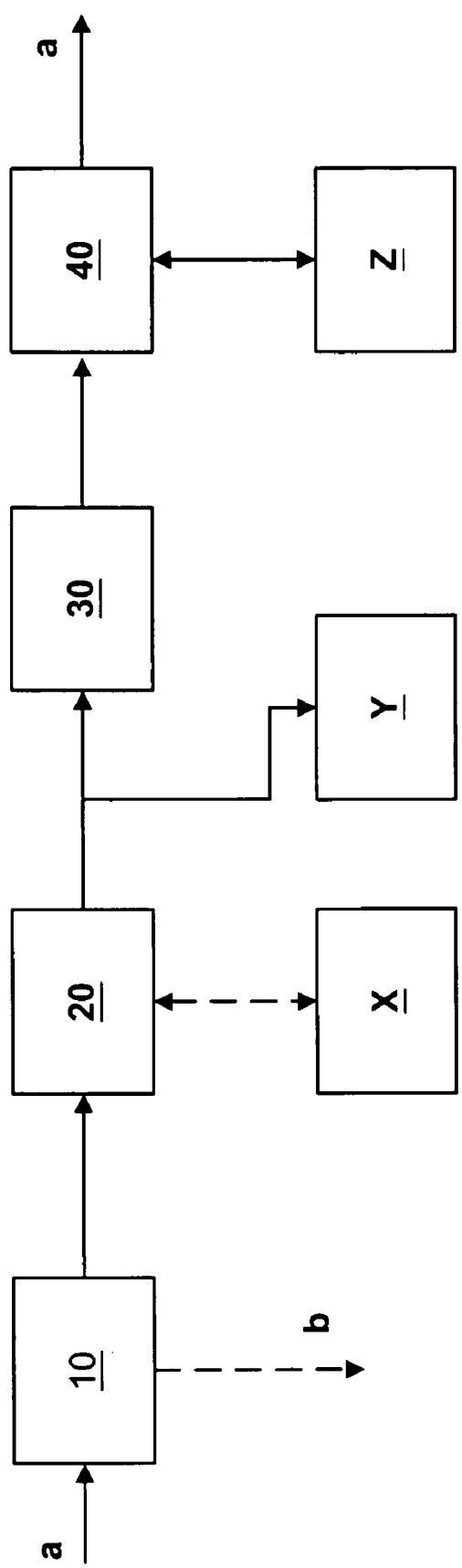

APPARATUS, METHODS AND ARTICLES OF MANUFACTURE FOR INTERCEPTING, EXAMINING AND CONTROLLING CODE, DATA, FILES AND THEIR TRANSFER

FIELD OF THE INVENTION

The present invention relates to apparatus, methods and articles of manufacture for intercepting, examining and controlling code, data and files and their transfer. More particularly, the present invention relates to apparatus, methods and articles of manufacture for analyzing code, data and files and their transfer.

BACKGROUND OF THE INVENTION

The rise of the Internet and networking technologies has resulted in the widespread transfer of code, data and files between computers. This material is not always what it seems to be. For example, code that is accessed on a remote machine and downloaded to a computer system can contain hostile algorithms that can potentially destroy code, crash the system, corrupt code or worse. Some of these hostile algorithms are viruses, worms, and Trojan horses.

Hostile, malicious and/or proscribed code, data and files ("code" as used hereinafter generally includes "data" and "files" but does not include text, such as textual email, instant messaging and the like) can infect a single computer system or entire network and so posit a security risk to the computer system or network. (As is industry standard parlance, "code" also includes copies. For example, UNIX systems routinely makes copies of the code in the course of processing the code.)

The user and/or administrator (generally referred to hereinafter as "user") may wish to intercept, examine and/or control such code.

The user might also wish to intercept, examine and/or control other code as well, for example, code which may be hostile. This latter type of code is known hereinafter as "predetermined code."

Antivirus or other similar packages attempt to protect the system or network from hostile, malicious, predetermined and/or proscribed code (generally referred to hereinafter as "proscribed code.") VFIND®, from CyberSoft, Inc., is one such product that may protect systems and networks from proscribed code. If the virus programs are not run frequently—an all too common occurrence—they will not protect the system. Therefore, the benefits and protections offered by antivirus programs are often lost.

Moreover, antivirus and similar programs often require frequent updating as they rely on a database of proscribed code. As new proscribed code is identified, the database must be updated. However, database updates may be delayed or simply not done and so the effectiveness of the program may wane with time.

Moreover, code is constantly mutating. That is, a hostile individual may release modified code, or a regular basis, in order to avoid detection by an antivirus or similar program.

Accordingly, it would be beneficial to have apparatus, methods and articles of manufacture to simply and effectively intercept, control, and/or examine incoming and outgoing code in an efficient and effective manner transparently or almost transparently to the end-user, with little or no operational effort required by the user.

It would also be beneficial to have methods of code analysis that attempt to intercept, control, and/or examine incoming and outgoing code.

SUMMARY OF THE INVENTION

The present invention comprises apparatus, methods and articles of manufacture to simply and effectively intercept, control, and/or examine incoming and outgoing code in an efficient and effective manner transparently or almost transparently to the end-user, with little or no operational effort required by the user.

Various embodiments, may process, which includes intercepting, examining, and/or controlling, any or all code in a computer or network, through code analysis. Intercepting, examining and/or controlling code includes but is not limited to sorting, altering, monitoring, blocking, logging, quarantining, discarding, redirecting and/or transferring code. The preferred embodiments are used in Unix® and Unix®-like platforms, including but not limited to Linux® and its variants, as well as other operating system platforms including but not limited to Microsoft Windows® XP, NT, 2000, 95, 98 and ME, IBM MVS, IBM OS/390, SNA, 3270 RJE, MacOS, VxWorks® and others.

BRIEF DESCRIPTION OF THE DRAWINGS

FIG. 1 shows a preferred embodiment.

DETAILED DESCRIPTION OF THE PREFERRED EMBODIMENTS

The present invention comprises apparatus, methods and articles of manufacture for intercepting, examining, and controlling code. The preferred embodiments, which may operate on a single computer system or multiple systems depending on the operating system and other variables process, that is, intercept, examine, and/or control any or all code transferred through any number of storage devices and/or connections in a computer or network, e.g., email, instant messaging, peer to peer, other network transfers, etc. Intercepting, examining and/or controlling code includes but is not limited to monitoring, blocking, logging, quarantining, discarding or transferring code.

The preferred embodiments implement code analysis. The code to be analyzed may be transferred through any number of connections in a computer system, systems, network or networks. The embodiments may also process code. Processing code, which includes intercepting, examining and/or controlling code, includes but is not limited to sorting, altering, monitoring, blocking, logging, quarantining, discarding, redirecting and/or transferring code.

Although various embodiments may be used to analyze code in various ways, the especially preferred embodiments are used in a Unix® environment. Especially preferred embodiment are used on a Unix® platform such as System V, Sun Solaris®, IBM AIX®, HP-UX®, etc. The following description of the preferred embodiments uses Sun Solaris® operating system Unix® terminology. However, it should be specifically understood that embodiments can be implemented in other Unix® and Unix®-like platforms, including but not limited to Linux® and its variants, as well as other operating system platforms including but not limited to Microsoft Windows® XP, NT, 2000, 95, 98 and ME, IBM MVS, IBM OS/390, SNA, 3270 RJE, MacOS, VxWorks® and others. Moreover, embodiments may be used in distributed computing or cross platform situations, such as for example, in a network using various protocols or mechanisms to transfer code.

FIG. 1 shows a preferred embodiment comprised of Tokenization Component 15, Hashing Component 20, Numerical Valuation Component 25 and Comparison Component 30.

Code is received by the embodiment and output by the embodiment along path a. Output b is also provided in the form of various values for the code, according to various parameters, which may be set as desired, e.g. through user preferences, default settings, etc. (It should be noted that, as the code travels through the embodiment of FIG. 1, in the direction shown by a, code may be optionally temporarily or permanently redirected to another path, e.g., one is shown by the direction c. Redirection is used here to mean transmission of the code to a path other than a code address. This may be for storage purposes, further analysis, etc.)

Any redirection component is not limited to code. Data about the code, such as processing statistics (e.g., amount of code processed, blocked, etc.) might also be gathered. This data might be used in various ways, such as transmitted to another system, retained for storage, etc.

Returning now to embodiment of FIG. 1, Tokenization Component 15 first tokenizes the received code, which involves translating characters within the code into discrete groups, known as tokens, according to automatically and/or manually set delimiters. For example, the presence of white spaces in code is used as a delimiter in preferred embodiments, e.g., a code string such as "FFIX TCACK" would be tokenized into two strings "FFIX" and "TCACK." (It should be noted that, although textual material is used throughout for ease of understanding, as was described above "code" as used herein generally includes "data" and "files" but does not include text, such as textual email, instant messaging and the like.)

Any desired delimiters may be used. In a preferred embodiment, for example, remarks or other non operational characters are used as delimiters, e.g., "/" or "0" may be used as delimiters, thus, for example, "FFIX/TCACK" or "FFIX0TCACK" would be tokenized into two strings "FFIX" and "TCACK". Tokens may vary in length.

In the especially preferred embodiments, the delimiters used are shown at Table I.

TABLE I

| \t (tab) | \r (carriage return) | \n (line feed) | \f (form feed) | \v (vertical tab) | \ |
|---|---|---|---|---|---|
| " | ( | ) | * | + | , |
| / | : | ; | < | = | > |
| ? | @ | [ | ~ | ] | ^ |
| ` | { | \| | } | [blank or white space] | |

The list of delimiters is exclusionary, which means that any character not identified as a delimiter is included within a token.

Example 1

Using the above table, "FFIX~TCACK[XMIT]TTAC" would be broken into tokens as: "FFIX", "TCACK", "XMIT", "TTAC".

In the especially preferred embodiments, tokens may be a single group of characters as well as multiple groups of characters. So, for example, the code "X NOT MYDOOM WORM" (assuming the token delimiter is a space) results in ten separate tokens as shown in Table II:

TABLE II

| Token | Number | Token | Number |
|---|---|---|---|
| "X" | 1 | "NOT MYDOOM" | 6 |
| "NOT" | 2 | "MYDOOM WORM" | 7 |
| "MYDOOM" | 3 | "X NOT MYDOOM" | 8 |
| "WORM" | 4 | "NOT MYDOOM WORM" | 9 |
| "X NOT" | 5 | "X NOT MYDOOM WORM" | 10 |

Returning to the embodiment of FIG. 1, output from Tokenization component 15 is passed to Hashing Component 20. In the especially preferred embodiments the code is hashed to produce a 32-bit value using the FNV-1a hash function from http://www.isthe.com/chongo/tech/comp/fnv/. The first token is hashed, producing a 32 bit or 4 byte value. If the code only has one token, then the value of that token is the resultant hash. If the code has more than one token, the 32 bit value is continued by hashing the second token, and then continued for subsequent tokens, until a final 32 bit hash value is reached.

In other embodiments, other hash methods may be used. For example, a 30 bit hash value may be generated for tokens. Also, in certain embodiments, additional information may be appended as well to the hash value. For example, other identification information, status information, etc. as desired. One especially preferred embodiment, described in further detail below, prepends group information to a 32 bit hash value, making a 34 bit string.

Each hash value obtained from each token, as explained above, may then be numerically valued, such as described in further detail below. However, further hash processing is used in especially preferred embodiments.

Further hash processing in the especially preferred embodiments involves assigning tokens to group levels. A group level is calculated by counting the number of tokens in the group minus 1. Four tokens (equal to Level 3) constitutes the largest number of tokens considered in especially preferred embodiments. A greater or lesser number could be selected in other embodiments. So, for example, with four group levels, the assignment of the tokens of Table 2 above to groups is shown in Table 3:

TABLE III

| Token | Group Level | Token | Group Level |
|---|---|---|---|
| "X" | Level 0 | "NOT MYDOOM" | level 1 |
| "NOT" | Level 0 | "MYDOOM WORM" | level 1 |
| "MYDOOM" | Level 0 | "X NOT MYDOOM" | level 2 |
| "WORM" | Level 0 | "NOT MYDOOM WORM" | level 2 |
| "X NOT" | Level 1 | "X NOT MYDOOM WORM" | level 3 |

The group level is then appended or prepended to the hash value of the token. In one especially preferred method, the group level is translated into binary, and it is prepended to the front of the hash value for the token, so the final string is a 34 bit word. In other embodiments, a 30 bit hash value may be used for any particular token, and a two bit group level then appended or prepended to that 30 bit hash, making a 32 bit string.

Returning to the embodiment of FIG. 1, once hash values are established and output from Hashing Component 20, they are passed to Numerical Valuation Component 25. Numerical Valuation Component 25 numerically values the hashes. It should be noted that the hash values may be used for code identification without numerical evaluation. For example, a hash value may be compared against stored hash values, e.g., a database of hashed values and the results utilized to provide code processing. For example, a hash value for code may be compared to a database of known proscribed code. If the hash value is present, the code may be redirected.

Any use of hash values may also involve processing those values. For example, an especially preferred embodiment processes hash values by constructing a code specific binary table of hash values. That code specific binary table is obtained by first sorting the hash values into a code specific binary tree by hash and hash count. (Hash count is the number of times that particular hash appears within the scanned code.) The code specific binary tree is then written in ascending sorted order, according to hash value, into a binary file, which is then available for further use.

Other embodiments may use other processing methods for the hash values. Hash values do not necessarily have to undergo processing and/or code identification. For example, numerical valuation could follow after obtaining hash values, with or without processing and/or code identification of those values.

The especially preferred embodiments utilize a sorting method for hash values prior to numerical evaluation. Each code specific binary table is then compared to one or more proscribed code indicators to provide a numerical valuation for the code. In the preferred embodiments, the proscribed code indicators may be one or more databases. Other indicators, such as lists, tables, arrays, markers, etc. may also be used.

The numerical valuation process in the especially preferred embodiments uses two databases: 1) a proscribed code database ("pcd"); and, 2) a non proscribed code database ("npcd"). These databases may have been constructed using a variety of methods, as will be further described below.

In especially preferred embodiments, each database contains a number of hash values sorted similarly to the code hash values. So, for example, if a code specific binary table is used, the databases will be sorted so as to minimize retrieval time for that code specific binary table sorting scheme.

Numerical valuation, in the preferred embodiments, takes place according to the following algorithm.

The numerical valuation is set to be a function of probability of any particular hash value being proscribed code. The probability of any particular code being proscribed code is in turn a function of the presence of the hash value in the proscribed code indicator. For each token i=1 . . . n, the probabilities $P(t_i|class=pcd)$ represented by the value $b_i$ and $P(t_i|class=npcd)$ represented by the value $g_i$ are calculated according to the following formulas:

$$b_i = \min(1, \text{count}(t_i, \text{class}=pc)/\text{count}(\text{class}=pc))$$

$$g_i = \min(1, \text{count}(t_i, \text{class}=npc)/\text{count}(\text{class}=npc))$$

pc=proscribed code
npc=non proscribed code
count(class=pc) is the number of pc codes in pcd
count($t_i$, class=pc) is the number of occurrences of $t_i$ in pcd
The count ratios can turn out larger than 1, so are limited to 1, using min.

A ratio $r_i$ is then computed:

$$r_i = \frac{1}{2}, \text{ if } b_i == g_i$$

$$= b_i/(b_i+g_i), \text{ if } b_i != g_i$$

and values $p_i$ and $q_i$ defined:

$$p_i = \max(0.01, \min(0.99, r_i))$$

$$q_i = 1 - p_i$$

resulting in a final ratio Ppc for $t_i$ being pc as:

$$\frac{P(t_i | \text{class} = pc)}{P(t_i | \text{class} = npc)} = \frac{p_i}{q_i} = Ppc$$

Ppc equates to an evaluation of the code. However, other evaluations may be used. For example, $p_i$ may be used as an evaluation, $q_i$ may be used, etc. Evaluations may be combined with each other as well, so that more than one is used, derivations are used, etc.

It should be noted that other methods of numerical valuation may be used as well. For example, hashing may be to the code or components of the code and numerical valuation of those hashes made. These alternative embodiments may be following tokenization, without tokenization, etc.

For example the number of identical hashes for the code may be provided. This number may be obtained locally, over a number of systems, through a network, etc. Time period analysis may be used as well in the valuation. For example, the number of identical hashes may be obtained for a predetermined time period, locally and/or over a number of systems.

Once the number is obtained, then it is compared to a predetermined threshold, which is, in the preferred embodiments done using Comparison Component 30. Redirection or other treatment may be then as desired.

So, for example, assuming code with hash value 3344 was received, over two hours, 1000 time on the local system and 1,000,000 times at the local router. A comparison to threshold reveals that such a number indicates proscribed code. All such code with that number are then redirected to a storage facility for later analysis.

It should be noted that in certain preferred embodiments, certain hash codes may be eliminated from threshold evaluation, for example, those resulting from messages that have already been analyzed, are preapproved, etc.

As noted herein, if code is indicated as proscribed, or otherwise redirected, further action using that indication may be taken. For example, if a code is proscribed code then a hash value of code could be stored. Incoming code and/or its components could then be compared to the stored hashes. If a match is made to the incoming code and/or its components, then the incoming code could be treated as was the compared code, (e.g. if the hashed code was a worm, the incoming code would also be marked as a worm,) redirected, etc.

Returning now to the embodiment of FIG. 1, Comparison Component 30 may be used to classify any particular token as pc by comparing it to a threshold value Tpc. Tpc is set somewhere between 0 and 1, excluding 0 and 1. So, for example, a threshold of 0.5 may be set in an embodiment. Then any token with a Ppc equal to or in excess of 0.5 would be identified as proscribed code and identified as such for further processing. Any token with a Ppc less than 0.5 would be identified as clean code and identified as such for further processing. The threshold may be modified during use as desired.

The especially preferred embodiments use VFIND®, a pattern detector from CyberSoft, Inc. as Comparison Component 30. Ppc is first printed to a text buffer and appended as a component of the code being scanned. The code with appended Ppc is then sent to VFIND or other pattern detector, where the Ppc is read and compared to Tpc. If Tpc is exceeded by Ppc, then various actions, including redirection, may be taken. For example the code may be placed in a buffer and a system administrator alerted, the code deleted and user notified, etc.

It should be noted that, by using a pattern or similar scanner as, or in addition to, Comparison Component 30, code may be scanned for other patterns as desired. For example, a virus scanner may be used to scan the code for viruses. Other scans for other patterns may take place as well.

There may be more than one hash value in any particular code being scanned because the code may have consisted of more than one token. The calculation of these multiple hash value codes involves the following algorithm:

The probability of particular code being proscribed code (pc) is set using the equation:

$$P(cde|class=pc)=P(t_1,t_2,\ldots,t_n|class=pc)$$

When the assumption that each hash value is evaluated independently is made an approximation may be obtained of the above equation. That approximation is:

$$P(cde|class=pc) \sim = P(t_1|class=pc)P(t_2|class=pc)\ldots P(t_n|class=pc)$$

As the hash values are not wholly independent—they came from the same code—a compensatory technique, as further described above, was used to obtain relations between words. That compensatory technique was to use consecutive tokens, in their various groups, to obtain the hash value tokens.

The probability of particular code being non proscribed code (npc) is also set using the equation:

$$P(cde|class=npc) \sim = P(t1|class=npc)P(t2|class=npc)\ldots P(tn|class=npc)$$

The ratio P/(1−P) is obtained by:

$$\frac{P}{1-P} = \frac{P(t_1|class=pc)\cdots P(t_n|class=pc)P(class=pc)}{P(t_1|class=npc)\cdots P(t_n|class=npc)P(class=npc)}$$

which results in Ppccode. Ppccode may then be compared to a threshold value Tpc in a similar manner to that as described above.

As Ppccode may result in an underflow to 0 and overflow to 1, a log ratio is used:

$$X = \log(P/(1-P))$$
$$= \log(p_1) - \log(q_1) + \ldots + \log(p_n) - \log(q_n) +$$
$$\log(P(class=pc)) - \log(P(class=npc))$$

The log probability can be computed as:

$$P_{log}=1/(1+e^{-x})$$

which may be compared to a threshold value Tpc in a similar manner to that described above.

In the especially preferred embodiments, $P_{log}$ may be used in a exponential function to obtain a probability, P, which may be compared to a threshold value Tpc in a similar manner to that described above.

As was described above, one or more proscribed code indicators is used in the comparison, and in the preferred embodiments, the proscribed code indicators may be one or more databases. The comparison process in the especially preferred embodiments uses two databases: 1) a proscribed code database ("pcd"); and, 2) a non proscribed code database ("npcd"). In other embodiments, other indictors besides proscribed code indicators may be used as well, and databases created for those indicators, comparisons done, etc.

The proscribed code indicators may be constructed automatically or manually or through a combination of techniques. For example, in the especially preferred embodiments, using pcd and npcd, the databases are initially populated through manual techniques, that is, code is processed and proscribed code identified manually. The databases are then further populated through automatic means as will now be described. In certain especially preferred embodiments, the databases are populated in whole or part using data generated from a pattern scanner such as VFIND from CyberSoft, Inc.

Assuming a hash record is generated, such as was described above with regard to the code specific binary table of hash values used in the especially preferred embodiments, the hashes generated from the code are sorted into one of two directories depending upon their resolution (i.e. whether the code was proscribed or non proscribed.) Thus, the embodiment contains a loopback mechanism, which updates the databases.

If more than one code strings are being processed, so that a series of hashes are generated, the hashes may be stored as desired in the databases, e.g., at regular or irregular intervals, etc.

In the preferred embodiments, the combined proscribed code and clean hash databases contain only hashes which occurred at least twice, to keep the size of the databases reasonable.

In the especially preferred embodiments, the process of database storage occurs through a number of steps, occurring daily, or at other intervals as desired:

Npc hashes generated in the previous day are merged into a daily npcd. Any particular code specific binary table of hash values may then be removed, retained for further analysis, etc.

Fourteen days of daily npcd are retained at any one time. Thus, when a new npc daily hash is generated, the oldest npc daily hash (14+1) is deleted. The daily npc hashes are merged into one master npc. In other embodiments, other periods of code scanning may be used to generate hash files as desired.

Hashes may be added selectively. For example, any hashes which only occurred less than twice overall, in the pc and npc databases, may be eliminated before being added to the daily npc.

Pc code hashes are held in the especially preferred embodiments through one period, which permits further manual or automated review of the code identified as pc by a system administrator. In that review for example, code may have been classified as pc inaccurately. By further reviewing the code classified as pc, any such inaccurate classifications may be repaired, and the code released.

Pc hashes generated in the previous day are merged into a daily npcd. Any particular code specific binary table of hash values may then be removed, retained for further analysis, etc.

Fourteen days of daily pcd are retained at any one time. Thus, when a new pc daily hash is generated, the oldest pc daily hash (14+1) is deleted. The daily pc hashes are merged into one master pc. In other embodiments, other periods of code scanning may be used to generate hash files as desired. It may be desired to keep the code input somewhat equal during those periods.

The period of time or other intervals used to generate daily pc and npc may be varied as desired. The number of daily pc and npc may be varied as well, as may be the number used to construct the pc or npc. For example, a lesser period than 14 days would, in relative terms, decrease the size of the master hash files and provide faster adaptation, and a greater period would, in relative terms, increase the size of the master hash files and provide slower adaptation but most likely increase accuracy, as it would have more past data included. A threshold lower or upper value for amount of stored code may also be used, in order to ensure the databases are operational.

The use of the most recent material creates a sliding window, which provides an "adaptive" training of the pc and npc databases. Thus, if the code changes over intervals the differences are included in the subsequent database matching.

In alternate embodiments, the invention comprises an article of manufacture, or signal-bearing medium, containing computer readable code. Examples of such articles include tarred code and other types and/or methods of storing, archiving and/or compressing code known in the art, contained on any media known in the art, such as CD-ROM's, floppy disks, etc.

The above description and the views and material depicted by the figures are for purposes of illustration only and are not intended to be, and should not be construed as, limitations on the invention. Moreover, certain modifications or alternatives may suggest themselves to those skilled in the art upon reading of this specification, all of which are intended to be within the spirit and scope of the present invention as defined in the attached claims.

We claim:

1. A method for analyzing code, performed by a computer system executing an antivirus program stored on a non-transitory computer-readable storage media, the computer system communicating over a network, comprising: valuing said code and thereby obtaining a code value, and, comparing said value to a threshold value, further comprising tokenizing said code and thereby obtaining tokens for said code, obtaining processing statistics for use in connection with the analysis of said code, and directing the code to an output path according to code parameters;

wherein obtaining processing statistics further comprises hashing said tokenized code tokens to obtain a hash value for said token; assigning one or more group identifications to said hash value of said token, wherein assigning one or more group identifications to hash values of said token comprises translating the group identifications to a binary and either prepending or appending a group level to said hash value of said token, wherein said hash value for said token is increased by an amount of said group level binary that has been prepended to or appended to said hash value of said token;

wherein said group level is a two bit appendage or prependage to said tokenized hash.

2. A method as in claim 1 further comprising redirecting said code from its intended transmittal path.

3. A method as in claim 2 further comprising redirecting said code by transferring said code to at least one storage component.

4. A method as in claim 1 wherein said valuing said code and thereby obtaining a value further comprises numerically valuing said code.

5. A method as in claim 4 further comprising redirecting said code from its intended transmittal path after comparing said numerical value to a threshold value.

6. A method as in claim 4 wherein numerically valuing said code further comprises comparing said code value to a proscribed code indicator.

7. A method as in claim 6 whereby said comparing said code value to a proscribed code indicator further comprises hashing said code and thereby obtaining a hash value, and setting a numerical value for said code to be a function of probability of any particular hash value being proscribed code.

8. A method as in claim 7 whereby the probability of any particular code being proscribed code comprises a function of the presence of a hash value for the code in a proscribed code indicator.

9. A method as in claim 7 whereby the probability of any particular code being proscribed code comprises calculating a proscribed code probability for a hash value.

10. A method as in claim 7 whereby the probability of any particular code being proscribed code comprises calculating a non-proscribed code probability for a hash value.

11. A method as in claim 6 whereby said proscribed code indicator is constructed, at least in part, from the group consisting of: data generated from a pattern scanner; data generated via a loopback mechanism; hash values which occurred at least twice; or proscribed code hash values generated over a predetermined time period.

12. A method as in claim 6 whereby said proscribed code indicator is constructed, at least in part, from the group consisting of: hash values which occurred at least twice; and proscribed code hash values generated over a predetermined time period.

13. A method as in claim 4 wherein numerically valuing said code further comprises comparing said code value to a non proscribed code indicator.

14. A method as in claim 13 whereby said non proscribed code indicator is constructed, at least in part, from the group consisting of: data generated from a pattern scanner; data generated via a loopback mechanism; hash values which occurred at least twice; or non proscribed code hash values generated over a predetermined time period.

15. A method as in claim 4 wherein numerically valuing said code further comprises: hashing said code, and thereby obtaining a hash value; and, counting said hash value.

16. A method as in claim 15 further comprising obtaining a number of occurrences of identical hash values.

17. A method as in claim 16 further comprising comparing said number of occurrences of identical hash values to a threshold value.

18. The method of claim 4, wherein numerically valuing said code further comprises comparing said code value to one or the other or both a non proscribed code indicator and a proscribed code indicator; whereby said comparing said code value to a proscribed code indicator or a non proscribed code indicator further comprises setting a numerical value for said code to be a function of probability of any particular hash value being proscribed code or being non proscribed code, wherein said probability of said code being proscribed code is a function of the presence of the hash value in the proscribed code indicator or the non proscribed code indicator, wherein each token is numerically valued and each token is determined in a count ratio that considers the number of proscribed code probabilities compared with the number of non proscribed code probabilities, and wherein said method further includes redirecting or treating said code based on said comparison.

19. A method as in claim 1 further comprising gathering processing statistics regarding said code.

20. A method as in claim 1 wherein tokenizing said code further comprises providing multiple tokens of multiple groups of characters in said code.

21. A method as in claim 1 wherein tokenizing said code further comprises compensating for relations between said tokens.

22. A method as in claim 21 wherein compensating for relations between said tokens further comprises using consecutive tokens by combining consecutive hashes of said code, wherein assigning one or more group identifications to hash values of said tokens comprises translating the group identifications to a binary and either prepending or appending a group level to said combined consecutive hashes for said tokens, and wherein said combined consecutive hashes for said tokens is increased by an amount of said group level binary that has been prepended to or appended to said combined consecutive hashes for said tokens.

23. A method as in claim 1 wherein assigning one or more group identifications to hash values of said code further comprises assigning up to four group levels to said hash values.

24. A method as in claim 1 further comprising scanning said code for viruses.

25. An apparatus configured for analyzing code comprising a non-transitory computer storage media that upon execution of stored instructions implements code analysis through a hashing component, a numerical valuation component which is configured to generate processing statistics for said code and a comparison component, wherein said code to be analyzed is tokenized by a tokenizing component to provide tokens for said code, wherein said tokens are hashed by said hashing component resulting in a hash value for said token, with said hash value being valued by said numerical valuation component in order to generate a numerical value, and with said numerical value being compared to a predetermined value by said comparison component;

wherein said non-transitory computer storage media upon execution of stored instructions further implements hashing said tokenized code tokens to obtain a hash value for said token; assigning one or more group identifications to said hash value of said token, wherein assigning one or more group identifications to hash values of said token comprises translating the group identifications to a binary and either prepending or appending a group level to said hash value of said token, wherein said hash value for said token is increased by an amount of said group level binary that has been prepended to or appended to said hash value of said token;

wherein said group level is a two bit appendage or prependage to said tokenized hash;

wherein said apparatus has a non proscribed code database and a proscribed code database;

wherein said numerical valuation component is configured with instructions for implementing numerical valuing of said code that includes comparing said code value to one or the other or both a non proscribed code indicator and a proscribed code indicator; whereby said comparing said code value to a proscribed code indicator or a non proscribed code indicator further comprises hashing said code and thereby obtaining a hash value, and setting a numerical value for said code to be a function of probability of any particular hash value being proscribed code or being non proscribed code, wherein said probability of said code being proscribed code is a function of the presence of the hash value in the proscribed code indicator or the non proscribed code indicator, wherein said numerical valuation component implements a determination of a numerical value that comprises a count ratio that considers the number of proscribed code probabilities compared with the number of non proscribed code probabilities;

wherein said comparison component is configured with instructions for implementing a comparison of said count ratio with a predetermined threshold to provide a comparison result;

said apparatus being configured with instructions for implementing redirection or other treatment of said code based on said comparison result.

26. A method for analyzing code, performed by a computer system executing an antivirus program stored on a non-transitory computer-readable storage media, the computer system communicating over a network, comprising:

valuing said code and thereby obtaining a code value, and, comparing said value to a threshold value, further comprising tokenizing said code and thereby obtaining tokens for said code, obtaining processing statistics for use in connection with the analysis of said code, and directing the code to an output path according to code parameters;

wherein obtaining processing statistics further comprises hashing said tokenized code tokens to obtain a hash value for said token; assigning one or more group identifications to said hash value of said token, wherein assigning one or more group identifications to hash values of said token comprises translating the group identifications to a binary and either prepending or appending a group level to said hash value of said token, wherein said hash value for said token is increased by an amount of said group level binary that has been prepended to or appended to said hash value of said token;

wherein said valuing said code and thereby obtaining a value further comprises numerically valuing said code;

wherein numerically valuing said code further comprises comparing said code value to a proscribed code indicator;

whereby said comparing said code value to a proscribed code indicator further comprises hashing said code and thereby obtaining a hash value, and setting a numerical value for said code to be a function of probability of any particular hash value being proscribed code; and whereby the probability of any particular code being proscribed code comprises a log function of a probability.

27. A method as in claim 26, whereby said log function of a probability is compared to a proscribed code indicator to provide a numerical value for said code.

* * * * *